United States Patent [19]
Herbreteau

[11] 4,356,487
[45] Oct. 26, 1982

[54] SOUNDING APPARATUS

[75] Inventor: Louis Herbreteau, Bretigny-sur-Orge, France

[73] Assignee: Commissariat a l'Energie Atomique, Paris, France

[21] Appl. No.: 164,543

[22] Filed: Jul. 2, 1980

[30] Foreign Application Priority Data

Jul. 6, 1979 [FR] France .............................. 79 17600

[51] Int. Cl.³ .......................................... G01S 13/95
[52] U.S. Cl. ............................. 343/5 W; 343/17.2 R
[58] Field of Search ......................... 343/5 W, 17.2 R

[56] References Cited

U.S. PATENT DOCUMENTS

| 3,720,949 | 3/1973 | Richter | 343/5 WX |
| 3,725,914 | 4/1973 | Davidson et al. | 343/5 W |
| 3,881,154 | 4/1975 | Lewis et al. | 343/5 WX |
| 3,945,011 | 3/1976 | Glasgow | 343/17.2 PC |
| 4,053,886 | 10/1977 | Wright et al. | 343/5 WX |
| 4,101,891 | 7/1978 | Jain et al. | 343/5 WX |
| 4,135,189 | 1/1979 | Josse | 343/17.2 RX |

Primary Examiner—T. H. Tubbesing
Attorney, Agent, or Firm—Kerkam Stowell, Kondracki & Clarke

[57] ABSTRACT

The present sounding apparatus is used for the detection and measurement of phenomena relating to the area surrounding the earth's globe. It can in particular be used in the study of the ionosphere and specifically for the study of limited amplitude, short duration modifications in the gradient of the electron density of the ionosphere. It can also be used for studying other phenomena, such as the study or monitoring of the sea swell.

8 Claims, 2 Drawing Figures

SOUNDING APPARATUS

BACKGROUND OF THE INVENTION

The present invention relates to a sounding apparatus for the detection and measurement of phenomena relating to the area around the earth's globe. This sounding apparatus is more particularly intended for the study of the ionosphere and specifically the study of low amplitude, short duration modifications to the gradient of the electronic density of the ionosphere. It can also be used in connection with the other phenomena such as, for example, the study or monitoring of the sea swell.

As is known, the ionosphere is the area in which, under the influence of solar radiation, a fraction of the atoms and molecules constituting the earth's atmosphere is separated into positive ions and negative electrons. At high altitude, the earth's atmosphere is very thin and the density of the electrons is very low. At low altitude, the atmosphere is much denser. As the solar radiation energy is consumed at high altitude for the ionization of the molecules, the residual energy of the solar radiation is no longer sufficient to produce any sufficient ionization. As a result, at low altitude the ionosphere constitutes a shield protecting the surface of the globe against certain dangerous ultraviolet rays. The greatest ionization occurs at an altitude of about 200 kilometers and reaches several thousand electrons per cubic centimeter. Thus, the most characteristic magnitude of the ionosphere is the electron density or ionization density. The knowledge of this density at different altitudes makes it possible to detect disturbances undergone by the ionosphere as a result of events on the earth's globe (e.g. earthquakes). The knowledge of the electron density of the ionosphere also makes it possible to study disturbances on the sun and in particular magnetic storms. These disturbances lead to a modification in the radiation emitted towards the earth. Finally, the ionosphere undergoes significant day and night variations, as well as seasonal variations due to the solar cycle which are well worth studying.

Various different types of sounding apparatus are known which make it possible to detect phenomena relative to the earth's globe and its environment and in particular phenomena relative to the ionosphere. One of these sounding apparatuses uses the radar principle and comprises a continuous wave generator, said waves being modulated by fixed frequency pulses. These pulses are transmitted in the direction of the ionosphere or the phenomenon to be detected and the resulting echoes are detected by a receiver as a function of their amplitude. Knowing the pulse transmission times, the pulse echo reception times on the phenomenon and their frequency, this detection makes it possible to determine the distance separating the phenomenon from the transmitter. An ionospheric layer cannot in fact be traversed by waves unless they have a frequency below a certain critical frequency linked with the electron density of said layer. Thus, waves transmitted at a predetermined frequency and which supply echoes at a known time relative to a transmission time make it possible to determine the distance of an ionospheric zone having an electron density corresponding to that necessary for the reflection of the electromagnetic sounding wave.

Another known type of sounding apparatus makes it possible to obtain more information on the evolution of the studied phenomena and particularly the ionized regions by the detection of small variations in the electron density. These sounding apparatuses utilize the Doppler radar method. Thus, ionospheric electron density variations as a function of time result in frequency displacements of the echos resulting from the waves transmitted in the direction of the atmosphere and, despite being very small, these displacements can be measured. In order to obtain a good spatial resolution of the sounding apparatus it is necessary for the pulses transmitted towards the atmosphere to be very short.

However, none of these sounding apparatuses makes it possible to carry out at the same time a measurement of the distance of the echos as a function of the sounding frequency, a measurement of the phase variations by the Doppler effect on more than two fixed frequencies and a measurement of the group propagation times of the transmitted modulated wave. This is particularly regrettable because in the ionosphere there are modifications of the electron density, which are only detectable by the Doppler effect, whose duration is below the performance time of a sounding operation by frequency ramp.

The known systems have other disadvantages and in particular that of being very sensitive to internal or external interference. Internal interference is essentially linked with the receivers of the sounding apparatus and which are often used at the absolute limits of their performances. These interference phenomena appear in the antenna circuits and in the filters. The receiver incorporates a local oscillator which, unless it has a very high spectral purity, has at its output a component which is prejudicial to the spectral purity of the Doppler information, as well as to the dynamics of the receiver. The filters of the intermediate frequencies and in particular those determining the band width of the receiver do not generally have a response in an appropriate phase, which lead to a deformation of the echo pulses. Consequently, rebounds appear and these constitute false echoes and considerably limit the discriminating power of the sounding apparatus. The external interference is due to that caused by transmissions in the radio-frequency range. In the case of Doppler measurements, this interference limits the choice of operating frequencies. It is possible to eliminate the interfernece by using very expensive broad band and directional antennas. When the sounding apparatus is of the "frequency ramp" type the emission rates are fixed, so that the problem caused by the interference is difficult to solve.

BRIEF SUMMARY OF THE INVENTION

The problem of the invention is to obviate the aforementioned disadvantages and in particular to provide a sounding apparatus simultaneously using phase and amplitude detection methods, which has maximum immunity to unwanted signals, which does not require the use of directional antennas and which permits, due to the simultaneous use of amplitude detection and phase detection, the simultaneous detection of the presence of a phenomenon and instantaneous disturbances undergone by this phenomenon. Thus, the sounding apparatus according to the invention makes it possible to simultaneously determine the ionospheric electron density distribution profile as a function of height, together with the instantaneous variations of this density. It also makes it possible to determine the distance of the sea swell.

The invention relates to a sounding apparatus for the detection and measurement of phenomena relative to the area surrounding the earth's globe, incorporating a channel for the transmission of electromagnetic waves in the direction of the phenomenon to be detected and measured and a channel for the reception of the echoes of these waves on said phenomenon, wherein the transmission channel comprises means for producing continuous electromagnetic waves at fixed regulatable frequencies and progressive regulatable frequencies in accordance with a frequency ramp, means for modulating the continuous waves with fixed regulatable frequencies by regulatable recurrence pulses and means for modulating the waves with regulatable progressive frequencies by said regulatable recurrence pulses, in such a way that the continuous wave pulses at regulatable progressive frequencies obtained after modulation are inserted between the continuous wave pulses of regulatable fixed frequencies obtained after modulation, a transmitter receiving the thus modulated electromagnetic waves, the reception channel incorporating a receiver receiving the echoes resulting from the transmission pulses on the phenomenon, said receiver having a reception channel with a regulatable tuning frequency, means whose one input is connected to the output of the receiver to detect the phases of the echoes resulting from the transmission pulses of continuous waves at regulatable fixed frequencies and means whereof one input is connected to the output of the receiver to detect the amplitudes of the echo pulses resulting from the transmission pulses of continuous waves at regulatable progressive and fixed frequencies and means for measuring the group transmission times of the transmitted modulated electromagnetic wave.

According to another feature of the invention, the means for modulating the electromagnetic waves by regulatable recurrence pulses comprise a Gaussian pulse generator with regulatable recurrence, whereof one output is connected to an input of a modulator which also receives the electromagnetic waves, the output of this regulator being connected to an input of the transmitter, and a logic circuit for the synchronization for this regulatable recurrence pulse generator.

According to another feature of the invention the sounding apparatus also comprises an automatic gain control device as a function of the interference level measured at the receiver input at the operating frequency, an output of said device being connected to a gain control input of the receiver, an input of said device being connected to the output of the receiver, whilst another input of the device receives an instruction voltage for fixing the gain of the receiver for each regulatable progressive frequency channel as a function of the interference level on said channel for any transmission, a threshold detector whose input is connected to the output of the receiver so as to control the transmitter for authorizing or refusing transmission on the frequency corresponding to this channel as a function of the maximum permissible interference level and, when transmission is refused, means for incrementing or decrementing the value of the regulatable progressive frequency by a quantity less than the frequency step of said ramp, so that the measured value differs little from the intended value.

According to another feature, the sounding apparatus also comprises means for recording and measuring the echoes connected to the outputs of the means for the amplitude and phase detection and the group time measurement.

According to another special feature, the echo recording and measuring means connected to the output of the phase and amplitude detection means are constituted by an oscilloscope, whose spot brightness circuit is controlled by an output of the detection means and whose scanning circuit is synchronized by pulses supplied by the regulatable recurrence pulse generator.

According to another feature, the oscilloscope has a memory.

According to another feature, the sounding apparatus according to the invention also comprises at least one Bessel filter with a regulatable center frequency connected between the receiver output and the inputs of the detectors and at least one Bessel filter with a regulatable center frequency connected between the outputs of the detectors and the inputs of the recording and measuring means, all the filters of the receiver having phase characteristics enabling it to transmit all the pulses without deformation.

According to another special feature, the echo recording means connected to the output of the phase detection means comprise a recorder connected to the output of the phase detection means by means of a device for sampling and storing the output signals of said phase detection means.

According to another feature of the invention the echo recording means connected at the output of the phase detection means comprise a magnetic tape recorder and means for evaluating the phase displacements introduced on recording the output signals of the receiver as a result of fluctuations in the position of the tape under the write-read head of the recorder.

Finally, according to another feature, the means for evaluating the phase displacements comprise a circuit for the simultaneous inscription or entry of the echoes received and phase reference signals on two different tracks of the tape.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
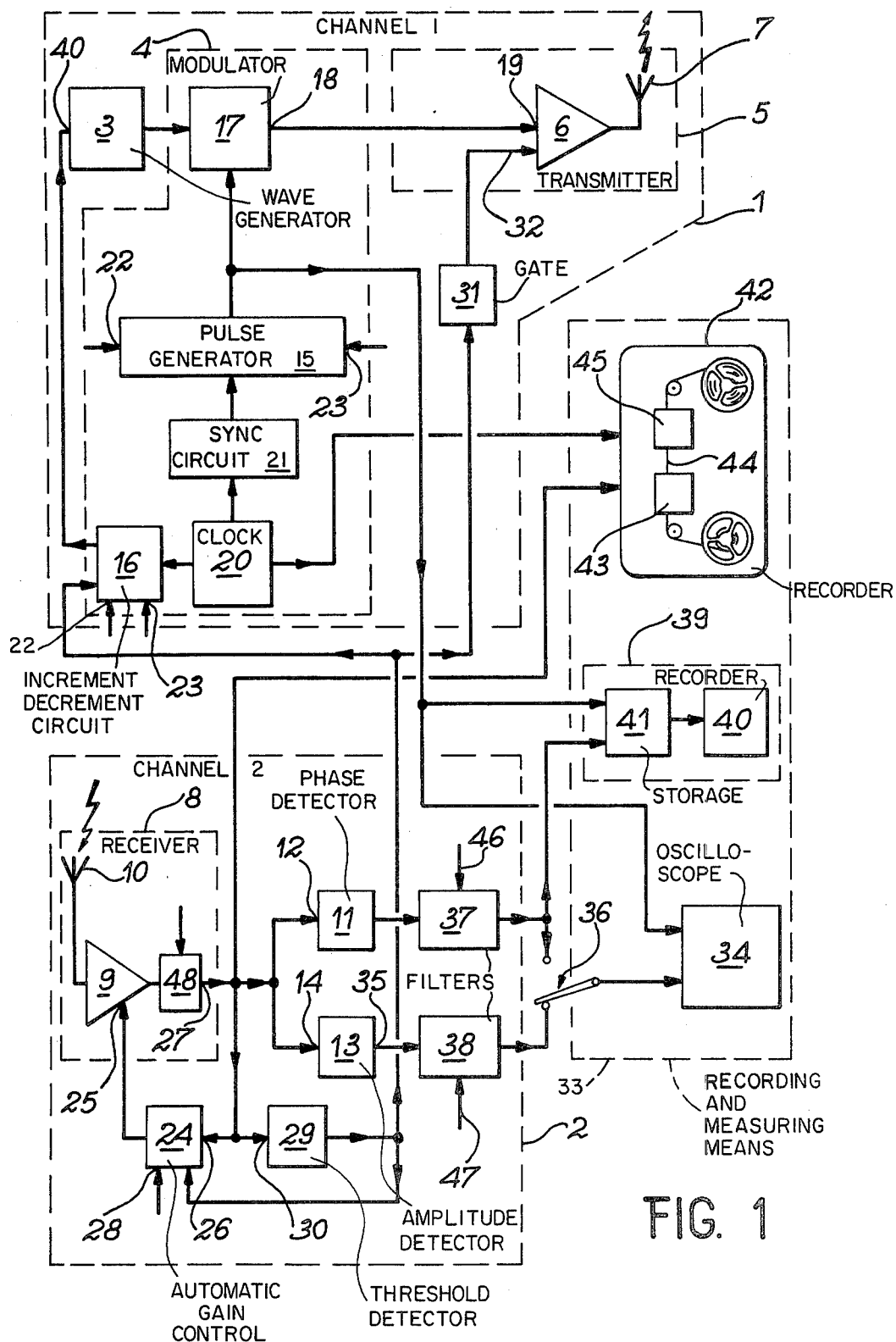
FIG. 1 a block diagram of the sounding apparatus according to the invention.

FIG. 1 diagrammatically shows a sounding apparatus according to the invention permitting the detection and measurement of phenomena relative to the earth's globe and the area surrounding it. This sounding apparatus comprises a channel 1 for the transmission of electromagnetic waves in the direction of the phenomenon to be investigated and a channel 2 for the reception of echoes of said waves on the phenomenon. The transmission channel 1 comprises means 3 for producing continuous electromagnetic waves at regulatable fixed frequencies (coherent mode) and regulatable progressive frequencies according to a frequency ramp (ramp mode). The means 3 can be constituted, for example, by a high frequency sine-wave signal generator. The frequencies (coherent mode and ramp mode) of signals supplied by the generator are regulatable by control signals reaching an input 40 of the generator. This transmission channel also has means 4 for modulating the continuous wave by variable recurrence pulses. Transmitter 5 receives the thus modulated electromagnetic waves and can comprise in per se known manner an amplifier 6, whose output is connected to the transmission antenna 7. The reception channel 2 comprises a receiver 8 constituted, for example, by an amplifier 9 whose input is connected to a reception antenna 10. In per se known manner, this receiver has not shown regulating and tuning means corresponding respectively to each of the reception frequencies. Means 11, whereof one input 12 is connected to the output of the receiver, make it possible to detect the phases of the echoes resulting from the electromagnetic wave pulses at regulatable fixed frequency of the coherent mode. In the same way means 13, whereof one input 14 is connected to the output of the receiver, make it possible to detect the amplitudes of echoes resulting from electromagnetic wave transmission pulses at regulatable progressive frequencies of the ramp mode. The means 4, which make it possible to modulate the electromagnetic waves of generator 3 by variable recurrence pulses comprise a Gaussian variable recurrence pulse generator 15, giving access to data relative to the slope of the ionogram when the sounding apparatus is used for ionospheric studies. The output of the generator is connected to an input of a modulator 17, whereof another input is connected to the output of the electromagnetic wave generator 3. The output 18 of modulator 17 is connected to the input 19 of transmitter 5. Generator 15 is obviously synchronized from a clock 20 via a logic synchronization circuit 21. The latter logic circuit makes it possible to regulate the width of the variable recurrence modulating pulses. The circuit 16 shown in the drawing is constituted in per se known manner and makes it possible to choose the operating mode (ramp or coherent frequency) of the generator 3. Obviously, the base frequency of each frequency ramp of the transmission electromagnetic wave can be controlled by signals from an input 22 of circuit 16, whilst the fixed frequencies can be controlled by signals from an input 23 of circuit 16. This sounding apparatus also comprises an automatic gain control device 24, whereof one output is connected to a gain control input 25 of amplifier 9 in receiver 8, whilst the input 26 of the gain control device is connected to the output 27 of receiver 8, whilst another input 28 receives an instruction voltage making it possible to fix the gain of the receiver for each reception frequency channel as a function of the permitted interference level on this channel prior to any transmission taking place. A threshold detector 29, whose input 30 is connected to the receiver output 27, makes it possible to control the transmission channels so as to authorize or refuse transmission on the frequency of each channel as a function of a predetermined amplitude threshold of the interference on each of the reception channels. This control can be realized by means of an analog gate 31 which acts on the control input 32 of amplifier 6 so as to block the transmission of the modulated electromagnetic waves when interference, such as background noise or unwanted signals exceed a predetermined amplitude threshold considered unacceptable for carrying out correct measurements. The device also comprises echo recording means 33 connected to the outputs of the phase detection means 11 and the amplitude detection means 13. These recording means comprise an oscilloscope 34, whereof the spot brightness control circuit, which is not shown in the drawing and which is constructed in per se known manner, is controlled by the outputs of the amplitude and phase detection means 13 and 11. The scanning circuit of the oscilloscope is synchronized by pulses supplied by the variable recurrence pulse generator 15. A two-position switch 36 makes it possible to visually display either the amplitude variations of the echos detected by the detector 13 or the phase variations of the echoes detected by detector 11. The oscilloscope is provided with a memory and also makes it possible to obtain the group transmission time of the echoes. The echoes from amplifier 9 of receiver 8 could suffer from rebounds which, in certain cases, would have a significant amplitude and lead to the detection of false echoes. In order to prevent unwanted detections, the sounding apparatus incorporates Bessel filters 37, 38 with a center frequency which is regulatable as a result of control signals from the control inputs 46, 47 of said filters. The filters are connected between the outputs of detectors 11, 13 and the inputs of recording and measuring means 33. All the filters of the receiver, such as filter 48, have phase characteristics enabling it to transmit all the pulses without deformations. Thus, filter 48 is placed between the inputs 12, 14 of the detectors and the output of the receiver which corresponds to one of the intermediate frequencies thereof. The sounding apparatus also incorporates echo recording means 39 connected at the output of the phase detection means 11. These means are constituted by a recorder 40 connected to the output of the phase detector 11 by means of a sampling and storage device 41. This, for example, graphic recorder permits the graphic representation of the Doppler effect as a function of time after sampling the phase detection signals from detector 11 and representing the phase variations of the echoes received by receiver 8. Finally, the echo recording means connected at the output of receiver 8 can be constituted by a recorder 42 with magnetic tapes 44, which also records the frequency reference clock pulses. This recorder comprises means 43 permitting the evaluation of phase displacements introduced by the recorder as a result of fluctuations in the positioning of tape 44 under the write-read head 45 of the recorder. The output signals of receiver 8 and of clock 20 are recorded on coherent tracks of the tape. One of these tracks serves for the recording of the receiver signals, whilst the other track serves for the recording of the reference signals from clock 20.

Figure 2:
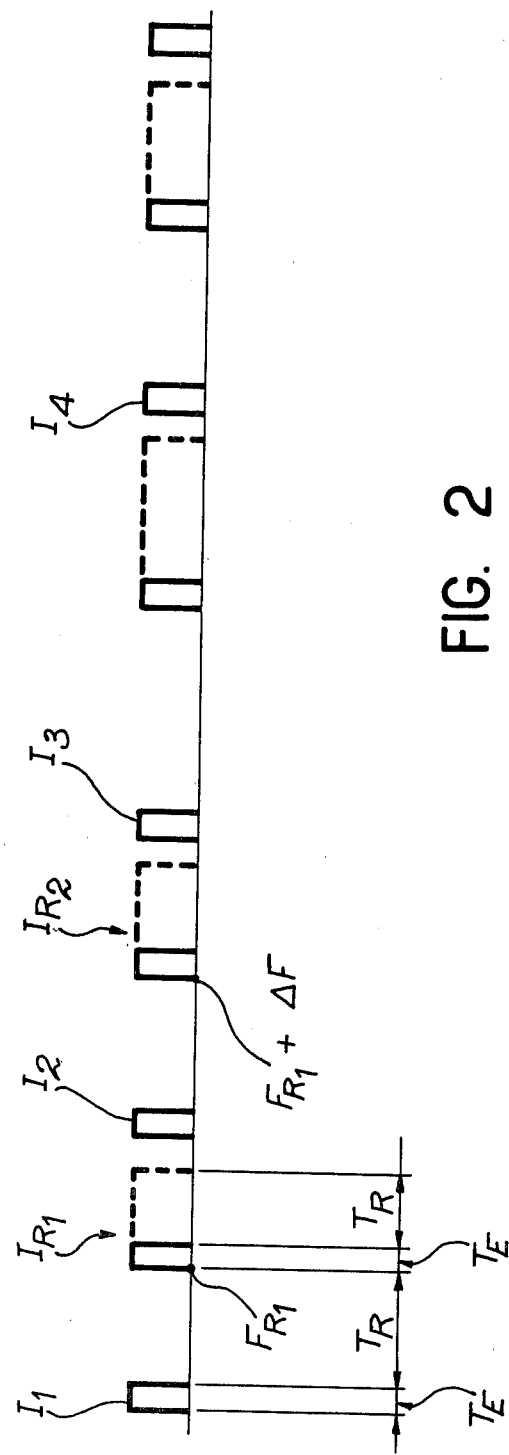
FIG. 2 a diagram of the electromagnetic pulses simultaneously transmitted in the ramp mode on the Doppler mode.

FIG. 2 is a diagram of the modulated electromagnetic wave pulses alternately transmitted in the ramp mode and the coherent mode. The variable recurrence pulses supplied by generator 15 and the electromagnetic waves with regulatable fixed frequencies (coherent mode) and regulatable progressive frequencies (ramp mode) reach modulator 17. The modulated fixed frequency electromagnetic wave pulses (coherent mode) are shown at $I_1$, $I_2$, $I_3$, $I_4$ and respectively have the frequencies $F_1$, $F_2$, $F_3$, $F_4$. The number of said frequencies is limited to four, but obviously the number can be larger or smaller than this. The modulated regulatable progressive frequency electromagnetic wave pulses (ramp mode) are positioned, channeled by channels between the modulated wave pulses of the coherent mode and are diagrammatically represented by shapes $I_{R1}$, $I_{R2}$, $I_{R3}$, $I_{R4}$, each of which represents the brief electromagnetic pulse transmitted during time $T_E$ followed by the corresponding reception time $T_R$. Generator 3 supplies electromagnetic waves whose frequencies vary as a function of a frequency ramp from the frequency $F_{R1}$ to a frequency $F_{R1} + n\Delta F$. In this expression, $F_{R1}$ designates the base frequency of the frequency ramp, whilst $\Delta F$ represents the incrementation step of the frequencies of the ramp, n being a whole number fixed by the operator as a function of the measurements to be performed. It is obvious that the logic circuit 21 controlled by clock 20 and making it possible to synchronize generator 15 also makes it possible to control by not shown connections the different elements of the transmission and reception channels so that the transmission channel operates during time $T_R$, whilst the reception channel is blocked, and the reception channel operates during the time $T_E$, whilst the transmission channel is blocked. The electromagnetic waves supplied by generator 3 are consequently modulated by pulses $I_1, I_{R1}, I_2, I_{R2}, I_3 \ldots$ etc. These modulated waves are transmitted due to amplifier 6 and antenna 7 in the direction e.g. of a layer in the ionosphere. These signals are reflected in the form of echo pulses in the direction of antenna 10. On reception, echoes are detected by phase or in amplitude and are then recorded so as to obtain, due to the recording means connected to the phase detector and amplitude detector, the Doppler variations, the amplitude variations and the group transmission times of the echoes. Prior to any transmission, in a frequency band corresponding to a given channel of the ramp mode, the threshold detector 29 synchronized by the logic circuit 21 by a not shown connection makes it possible to authorize or refuse transmission on the frequency corresponding to this channel, as a function of the maximum permitted interference level. If this level does not exceed the permitted level, the automatic gain control device 24 controls the gain of the reception amplifier 9 from an instruction voltage applied to input 28 in such a way that amplifier 9 operates with a maximum gain. If, however, the maximum predetermined level is reached, detector 29 can block reception in the frequency channel in question by means of the analog gate 31 of the transmission channel. It is also possible, if said maximum level is reached, to act on circuit 16 so as to bring about an incrementation of the frequency of the wave supplied by generator 3 in order to test the interference level in a channel with an adjacent frequency. The different recording means described hereinbefore make it possible to record e.g. ionograms, which represent, as a function of time and for known frequencies of the modulated waves, the amplitudes, group transmission times and phase variations of the echoes of the waves modulated on the ionospheric layers. Thus, as a result of this ionogram, it is possible to determine the electron density distribution profile of the ionospheric layers as a function of altitude. Circuit 43 for the simultaneous inscription or entry on two tracks of signals from the receiver and the clock makes it possible to detect, when the magnetic tape passes under the write-read head 45 of recorder 42, variations in the interfering faces due to fluctuations in the tape speed, as well as to the poor positioning of the latter below the write-read head. If one of the tracks records the signals of the receiver and the other records the signals from the clock, said clock signals serve as a time reference for recording the signals from the receiver. To carry out a correction to the interfering variations in phases introduced by the recorder, it is merely necessary to record on the track carrying the Doppler data from the receiver the clock signals for the time of the transmission. Thus, when the tape is poorly positioned, it is possible to know the interfering phases due to the said interference.

The sounding apparatus described hereinbefore in connection with ionospheric studies can also be used for the study of other phenomena linked with the earth's globe such as for example the detection of sea swells. In this case, the sounding apparatus is pointed towards the swell and it is able to determine on the one hand the approach of the latter and on the other the speed or speed variation thereof. In this application, the recording means make it possible to determine the different parameters.

It is obvious that the means described hereinbefore relative to the sounding apparatus can be replaced by equivalent means without passing beyond the scope of the invention.

I claim:

1. A sounding apparatus for the detection and measurement of phenomena relative to the area surrounding the earth's globe, comprising a channel (1) for the transmission of electromagnetic waves in the direction of the phenomenon to be detected and measured and a channel (2) for receiving the echoes of said waves on the phenomenon, the transmission channel (1) incorporates means (3) for producing continuous electromagnetic waves with fixed regulatable frequencies and regulatable progressive frequencies as a function of a frequency ramp, means (4) for modulating the fixed regulatable frequency continuous waves by regulatable recurrence pulses and for modulating the regulatable progressive frequency waves by regulatable recurrence pulses in such a way that regulatable progressive frequency continuous modulated wave pulses are introduced between regulatable fixed frequency continuous modulated wave pulses of electromagnetic waves, a transmitter (5) receiving the thus modulated electromagnetic waves, and reception channels (2) incorporating a receiver (8) receiving the echoes resulting from the modulated waves transmitted onto the phenomenon, said receiver (8) having a regulatable tuning frequency reception channel (10), the receiver also including means (11) whereof one input is connected to the output of the receiver (8) for detecting phases of the echoes resulting from the regulatable fixed frequency continuous modulated transmitted waves and means (13), whereof one input is connected to the output of the receiver (8) for detecting the amplitudes of the echoes resulting from the regulatable progressive and fixed frequency continuous modulated transmitted waves, wherein the means (4) for modulating the electromagnet waves by regulatable recurrence pulses incorporate a regulatable recurrence Gaussian pulse generator (15), whereof one output is connected to an input of a modulator (17) which also receives the electromagnetic waves, the output of the said modulator (17) being connected to an input of the transmitter (5), modulating means including a logic synchronization circuit (21) of said regulatable recurrence pulse generator, reception channel (2) further comprising an automatic gain control device (24) as a function of the level of the interference measured at the receiver input at the operating frequency, an output of said device being communicated to a gain control input of the receiver (8), an input of said device being connected to the receiver output, while another input (28) of said device receives an instruction voltage for fixing the receiver gain for each regulatable progressive frequency channel, as a function of the interference level on said channel before any transmission takes place, a treshold detector (29) whose input is connected to the receiver output so as to control the transmitter in order to authorize or refuse transmission on the frequency corresponding to said channel, as a function of the maximum permitted interference level, the transmission channel further including means (16) for incrementing or decrementing the regulatable progressive frequency level by a quantity less than the frequency step of said ramp when transmission is refused in order that the measured value differs little from the intended value, the transmission and reception channels acting in the radio-frequency band between 200 kHz and 30 MHz, the echoes phase detection means (11) being Doppler detection means.

2. A sounding apparatus according to claim 1, wherein it also comprises echo recording and measuring means (33) connected to the outputs of the phase and amplitude detecting means.

3. A sounding apparatus according to claim 2, wherein the echo measuring and recording means (33) connected at the output of the amplitude and phase detection means comprises means for measuring group transmission times and is constituted by an oscilloscope (34), whose spot brightness circuit is controlled by an output of the phases and amplitude detection means (11, 13) and whose scanning circuit is synchronized by the pulses supplied by the regulatable recurrence pulse generator (15).

4. A sounding apparatus according to claim 3, wherein the oscilloscope is a memory oscilloscope.

5. A sounding apparatus according to claim 3, wherein it also comprises at least one Bessel filter (38) having a regulatable center frequency this filter being connected between the output of the receiver (8) and inputs of phases and amplitude detector means (11, 13) and at least one Bessel filter (37 or 38) with a regulatable center frequency connected between the outputs of the detectors (11, 13) and the inputs of the recording and measuring means, the receiver having filters having phase characteristics for transmitting all the pulses without deformation.

6. A sounding apparatus according to claim 2, wherein the echo recording and measuring means (33) connected at the output of the phase detection means incorporate a recorder (40) connected at the output of the phase detection means (11) through a sampling and storage device (41) for the output signals of the said phase detection means.

7. A sounding apparatus according to claim 2, wherein the echo recording and measuring means (33) connected at the output of the phase detection means (11) incorporate a magnetic tape recorder (42) and means (43) for evaluating the phase displacements introduced on the recording of the output signals of the receiver as a result of fluctuations in the position of the tape beneath (44) a write-read head (45) of the recorder.

8. A sounding apparatus according to claim 7, wherein the means (43) for evaluating the phase displacements comprises a circuit for the simultaneous inscription or entry of the echoes received and of the phase reference signals on two different tracks of the tape.

* * * * *